March 16, 1971  L. K. SHEPARD ET AL  3,570,838
SPRING ACTUATED CLAMPING MECHANISM
Filed Dec. 4, 1968  3 Sheets-Sheet 1

INVENTORS.
Lyman K. Shepard
William D. Walters
BY
Harness Dickey & Pierce
ATTORNEYS March 16, 1971   L. K. SHEPARD ET AL   3,570,838

SPRING ACTUATED CLAMPING MECHANISM

Filed Dec. 4, 1968   3 Sheets-Sheet 3

INVENTORS
Lyman K. Shepard
William D. Walters

BY
James Pickey & Paine
ATTORNEYS

United States Patent Office 3,570,838
Patented Mar. 16, 1971

3,570,838
SPRING ACTUATED CLAMPING MECHANISM
Lyman K. Shepard, Upper Saddle River, and William D. Walters, Ridgewood, N.J., assignors to Standard Tool & Manufacturing Company
Filed Dec. 4, 1968, Ser. No. 781,178
Int. Cl. B25b 5/08
U.S. Cl. 269—254
7 Claims

ABSTRACT OF THE DISCLOSURE

The clamping mechanism locates, raises, and clamps a pallet to the underside of overhanging rail elements upon the release of spring actuated plungers which move clamping pins upwardly. Upon retracting the plungers and stressing the springs, the pins are positively lowered to lower the pallet on rails on which a plurality are advanced simultaneously to the next station.

BACKGROUND OF THE INVENTION

Reference may be had to the F. A. Solski et al. Pat. No. 3,271,840 to which the spring actuated clamping mechanism is applied and which was assigned to the assignee of the present invention.

SUMMARY OF THE INVENTION

The machine of the above mentioned patent has a plurality of in-line stations at which machining operations are performed. An angularly adjustable rod has spaced aligned pins thereon which when in vertical position engage and move a plurality of pallets from one station to the next when the rod is advanced and upon the turning of the rod to dispose the pins horizontally the rod is retracted to its initial position. At the machining stations, horizontally movable plungers have cam surfaces in engagement with the cam surfaces of vertically movable pins to produce the upward and downward movement thereof to locate and clamp the pallets upon the movement of the plungers. In the present arrangement, the aligned plungers have rollers on the adjacent ends which engage recessed cam surfaces on an actuating bar. The opposite ends of the plungers are engaged by springs which, when the bar is retracted, actuate the clamping mechanism. The springs are compressed when the plungers are moved outwardly away from each other by the cam surfaces of the bar and the clamping pins are lowered out of engagement with the pallet which rests upon rails on which they are advanced. After the movement of the pallets, the advancement of the actuating bar permits the plungers to be moved toward each other by the springs to raise the pins which first accurately locate the pallets and thereafter clamp the pallets at each station. A ram is provided at each end of the aligned actuating bars so that they can be moved in one direction to compress the springs and lower the pallets and in the opposite direction to raise, locate and clamp the pallets.

DESCRIPTION OF THE PREFERRED EMBODIMENT

Figure 1:
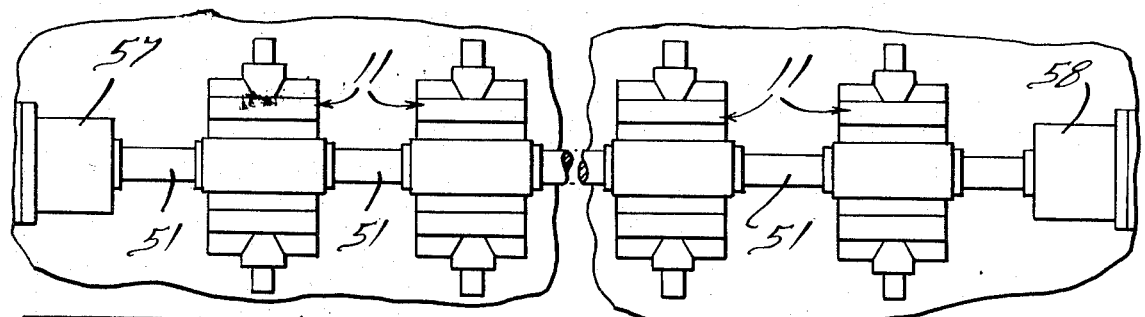
FIG. 1 is a broken plan view of a plurality of spring actuated clamping mechanisms which are simultaneously operated in a manner embodying the present invention.

The mechanism 11 of the present invention is applied to a machine similar to that illustrated and described in the above mentioned patent. The structure of the present invention eliminates the individual rams for actuating the plungers and the fluid system required for their operation. The device of the patent has rails 12 on which the pallets are advanced by pins 13 on a reciprocal rod 14 which rides on rollers 15 secured to the top of a body member 16 of each of the mechanisms 11. When the pins 13 are substantially in vertical position, the advancement of the rod 14 advances pallets 17 to the next adjacent station. Upon the angular movement of the rod substantially 90° the pins are moved to a substantially horizontal position so that the rod 14 can be retracted.

The body member 16 carries a pair of vertically disposed bushings 18 having vertically movable pins 19 and 21 disposed therein. Additional bushings 22 are provided at the bottom of the body in position to encompass the bottom ends of the pins 19 and 21. The pins 19 and 21 are similar to the pins of the above mentioned patent, the pin 19 having a sloping surface 23 which urges the pallet 17 to the left against a stop pin 24 while the pin 21 has a sloping cam surface 25 which engages a locating slot 26 which centers the pallet at the station. A pair of plungers 27 and 28 are aligned with the pins 19 and 21 and are disposed at right angles thereto. A diametrical recess in the plungers provides a cam block 29 while a cutaway portion in the pins provide a cam recess 31. The recessed side of the pins 19 and 21 is cut away to provide a face 32 which mates with the diametrical face 33 of the plungers 27 and 28. The cam block 29 of the plungers has a top sloping surface 34 which forms a clamping surface and a forward surface 35 at a greater angle to provide an initial raising surface. A sloping surface 36 on the bottom of the cam block 29 engages a similar sloping surface 38 on the pin for initially raising the pins 19 and 21. A surface 39 in extension of the surface 38 has the same slope as that of the surface 34 which when engaged thereby produces a locking force for the pallet 17. The plungers are mounted in sleeve bearings 41 in the body member 16, the rear end of the plunger having a recess 42 for receiving one end of a spring 43. The opposite end of the spring is encased in a hollow cylindrical element 44 which is secured to the body member 16 by screws 45 in extension of the outer ends of the plungers. The springs urge the inner ends of the plungers toward each other to first have the surface 35 thereof engage the surface 38 of the pins to move the pins 19 and 21 upwardly and thereafter have the surface 34 engage the surface 39 and produce a maximum force for clamping.

Each adjacent end of the plungers has pins 46 secured therein to span a slot 47 in which a roller 48 in the nature of a ball bearing is supported on the pin. The pins are secured in fixed relation to plungers by screws 49.

Figure 2:
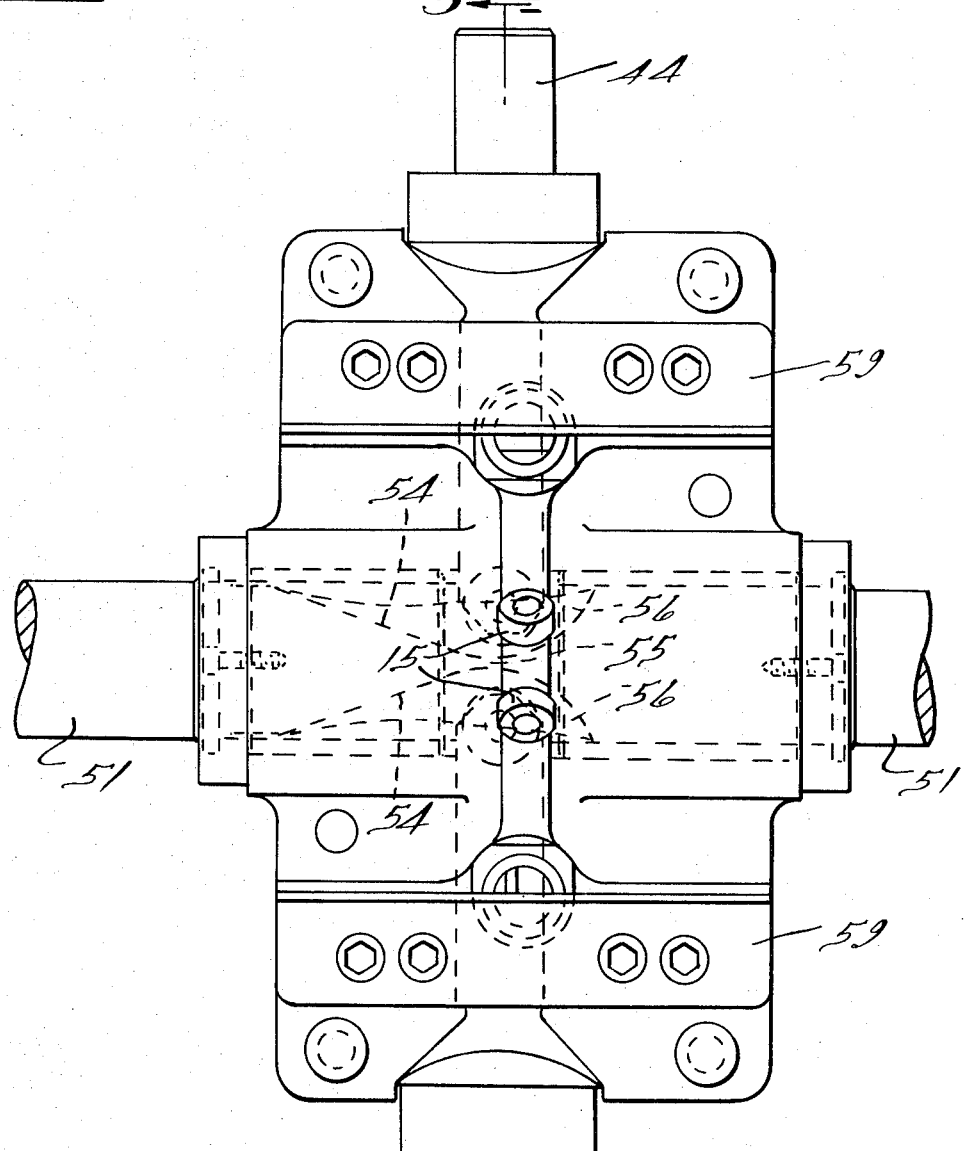
FIG. 2 is an enlarged plan view of one of the mechanisms illustrated in FIG. 1.
Figure 3:
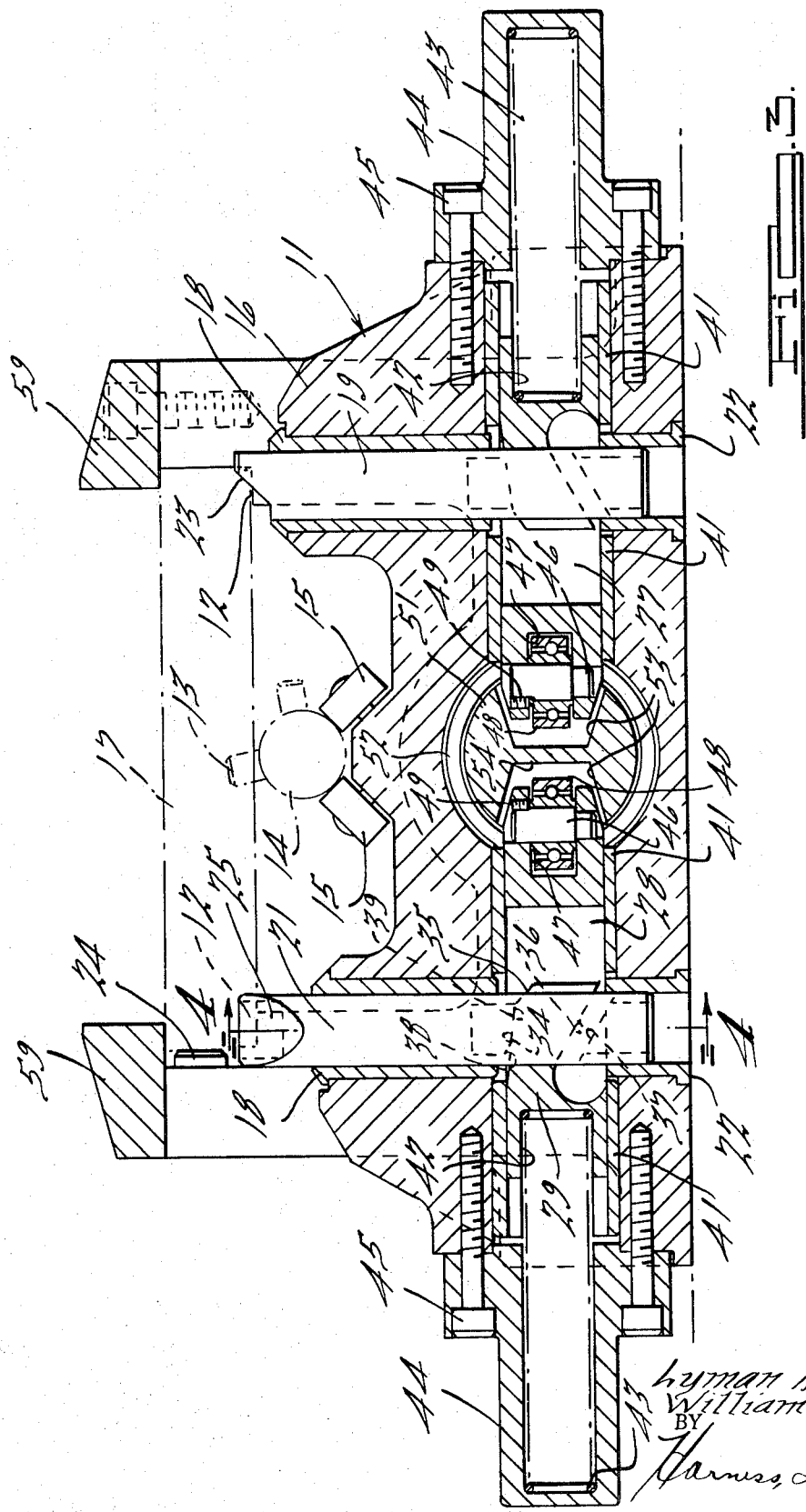
FIG. 3 is an enlarged sectional view of the structure illustrated in FIG. 2, taken on the line 3—3 thereof.
Figure 4:
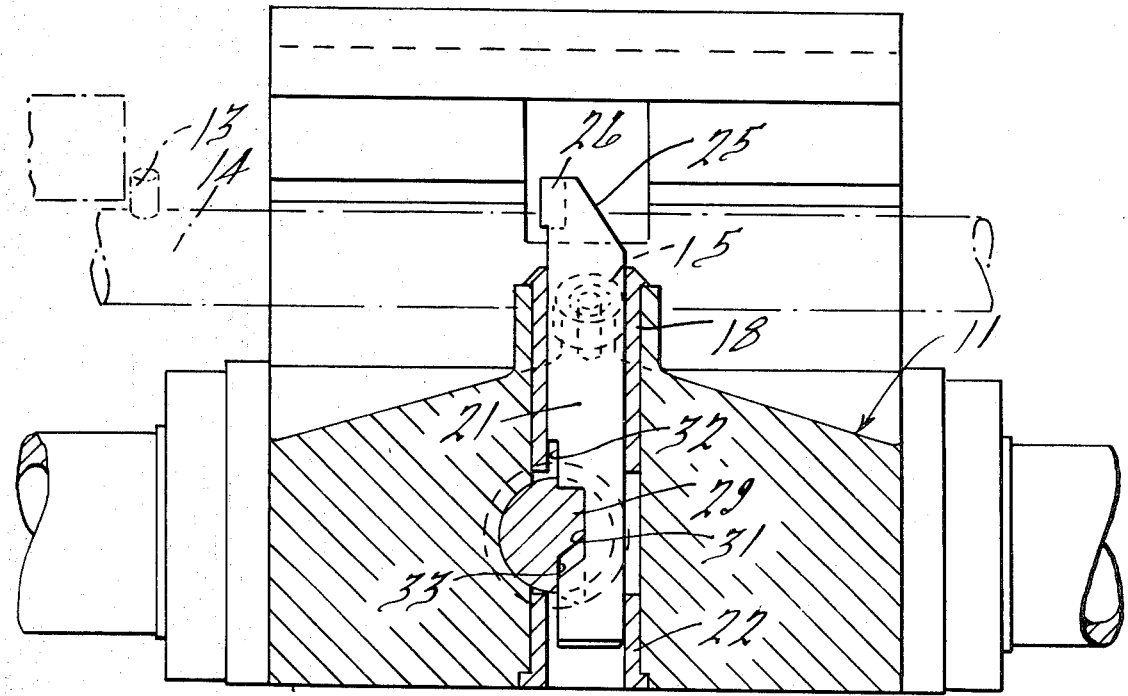
FIG. 4 is a sectional view of the structure illustrated in FIG. 3, taken on the line 4—4 thereof.
Figure 5:
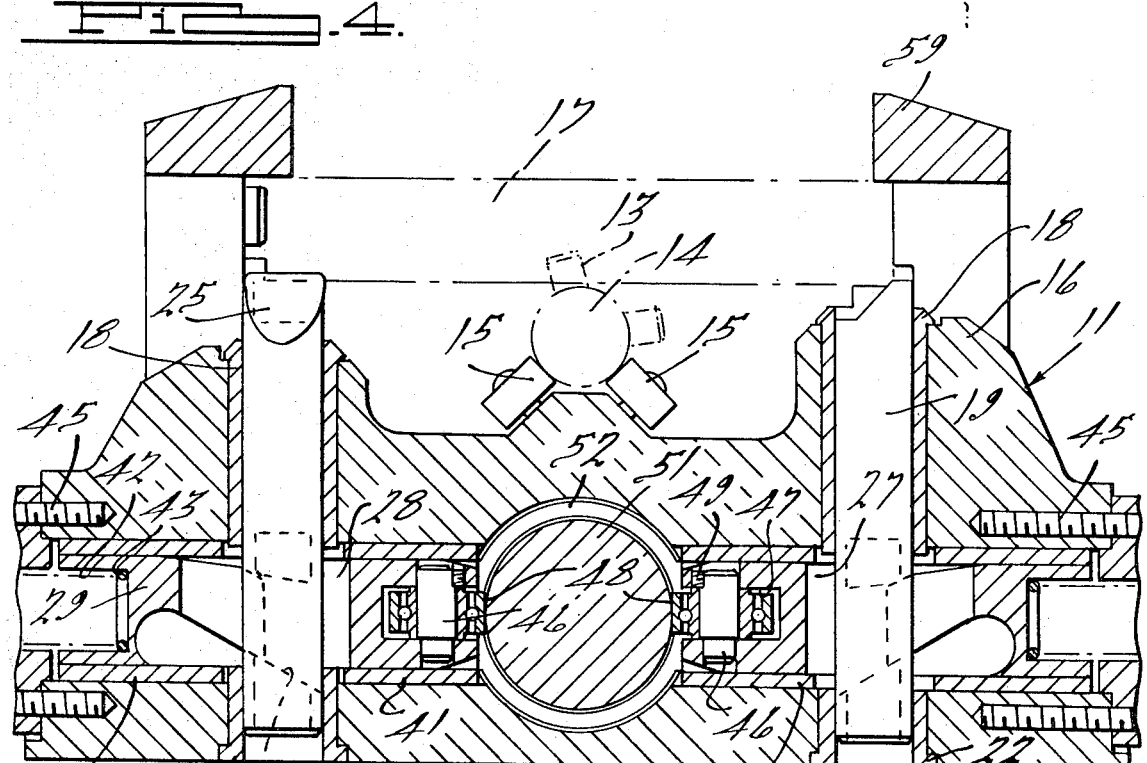
FIG. 5 is a broken view of the structure illustrated in FIG. 3, showing the pallet in unclamped position.

Centrally of the body an actuating bar 51 is supported on a sleeve bearing 52 having oppositely disposed recesses 53 into which the rollers 48 extend. As illustrated in FIG. 2, the recesses are diametrically disposed, the inner surfaces 54 of which slope at an angle to a depth at the point 55 where the surfaces are spaced slightly apart to form pockets 56. The rollers are out of contact with the sloping surfaces when in the pockets 56 at the end of the stroke of the actuating bar 51 so that the movement of the plungers 27, 28 toward each other will not be interfered with.

As illustrated in FIG. 1, a plurality of the mechanisms 11 are mounted on a machine similar to the one illustrated in the above set forth patent, to have the bars 51 in abutting relation to each other. A ram 57 on the left-hand end of the assembly moves the bars to the right while the ram 58 at the right-hand end of the assembly moves the bars to the left. After the pallets 17 have been advanced from a plurality of stations to the next adjacent station, the bars 51 are moved to the left by the actuation of the ram 58 to move the sloping surfaces 54 to the position illustrated in FIG. 2 out of engagement with the rollers 48 to permit the springs 43 to urge the plungers 27, 28 toward each other. During this movement the cam surface 35 engages the cam surface 38 and quickly raises the pins 19 and 21 an initial amount after which the cam surface 34 will engage the cam surface 39 to further raise the pins and thereby tightly clamp the pallet 17 against the under surface of a overhanging rail elements 59. In case of the presence of a chip or for some other reason the pallet will not seat on the rail element 59, the structure will not overstress as the applied force is limited by the strength of the springs 43. The springs exert approximately 200 pounds pressure on the plunger which is sufficient, in view of the slope of the cam surfaces 34 and 39, to tightly clamp the pallet without deleteriously affecting any of the surfaces or parts of the mechanism.

After the machining operation, the ram 57 is actuated to move the actuating bars 51 to the right, as viewed in FIG. 2, to advance the sloping surfaces 54 between the rollers 48 to thereby move the plungers outwardly, away from each other, to compress the springs 43. This outward movement causes the sloping surface 36 on the plungers to engage cam surface 37 on the pins 19 and 21 and move the pins downwardly to release the pallet and drop it onto the rails 12 so that it can thereafter be advanced. While rams 57, 58 have been illustrated at opposite ends of the assembly of the mechanism 11 for moving the actuating bars 51, it is to be understood that cams or other means may be employed in lieu thereof for moving the bars the distance required for retracting and releasing the plungers which, in the present instance, is approximately four inches. It is to be understood that one of the mechanisms 11 will be applied to each station at which the pallet is to be clamped and a machine operation performed and where the station is blank, the body with a section of a bar 51 therein may be substituted for the mechanism at the blank station, so that the bars will be continuous in the area in which they are to be actuated.

What is claimed is:

1. In a spring actuated clamping mechanism for a pallet, a body, a pair of axially movable clamping pins carried by said body, a pair of axially movable plungers carried by said body and located at right angles to said pins, cam means on said pins and plungers for advancing and retracting said pins to clamping and unclamping positions, spring means for urging said plungers to advance said pins to clamping position, and means between said plungers for moving said plungers away from each other to retract said pins and to compress said spring means.

2. In a spring actuated clamping mechanism for a pallet as recited in claim 1, wherein said moving means for said plungers is a cylindrical actuating bar having sloping cam surfaces.

3. In a spring actuated clamping mechanism for a pallet as recited in claim 2, wherein a plurality of mechanisms have the ends of the actuating bars in abutted relation, and means for positively moving said bars axially and simultaneously in one or the other direction.

4. In a spring actuated clamping mechanism for a pallet as recited in claim 3, wherein roller means are mounted on the adjacent ends of the plungers for engaging the sloping surface of the actuating bar.

5. In a spring actuated clamping mechanism for a pallet as recited in claim 4, wherein the sloping surfaces in the bar are of sufficient depth at one end to entirely release the roller means so as not to interfere with the advancement of the plungers by the springs when clamping the pallet.

6. In a spring actuated clamping mechanism for a pallet as recited in claim 1, wherein the clamping force for the pallet is produced by a second set of cam means on the pins and plungers which exert a greater force on the pins when the plungers are further urged by the spring means.

7. In a spring actuated clamping mechanism for a pallet as recited in claim 1, wherein the cam means on each of the pins and plungers are mating surfaces which slope at different angles, the first mating surfaces producing a greater movement to the pins, the second mating surfaces producing less movement thereto but a greater clamping force.

References Cited
UNITED STATES PATENTS

| | | | |
|---|---|---|---|
| 1,936,263 | 11/1933 | Pope | 269—153 |
| 2,424,090 | 7/1947 | Gordinier | 269—310 |
| 2,696,764 | 12/1954 | Sternbergh | 269—310 |
| 3,211,447 | 10/1965 | Kaase | 269—153 |

WILLIAM S. LAWSON, Primary Examiner

D. D. EVENSON, Assistant Examiner

U.S. Cl. X.R.

74—110; 269—310